(12) United States Patent
Khananayev et al.

(10) Patent No.: US 8,409,036 B1
(45) Date of Patent: Apr. 2, 2013

(54) MUSCULAR MEMORY TRAINING APPARATUS AND METHOD

(76) Inventors: Vladimir Khananayev, Wheeling, IL (US); Grigory Khananayev, Bethesda, MD (US); Roman Borochin, Glenview, IL (US); Marina Borochin, Glenview, IL (US)

( * ) Notice: Subject to any disclaimer, the term of this patent is extended or adjusted under 35 U.S.C. 154(b) by 7 days.

(21) Appl. No.: 13/531,521

(22) Filed: Jun. 23, 2012

(51) Int. Cl.
A63B 69/00 (2006.01)
(52) U.S. Cl. ........................................ 473/447; 473/416
(58) Field of Classification Search ................. 473/455, 473/448, 447, 446, 445, 416; 434/248, 236; 356/28; 702/148
See application file for complete search history.

(56) References Cited

U.S. PATENT DOCUMENTS

| | | | | |
|---|---|---|---|---|
| 3,229,975 A | * | 1/1966 | Tompkins et al. | 473/456 |
| 3,596,376 A | * | 8/1971 | Avedissian et al. | 434/236 |
| 3,777,410 A | * | 12/1973 | Robinson | 434/323 |
| 4,565,527 A | * | 1/1986 | Burchett | 434/248 |
| 4,770,527 A | * | 9/1988 | Park | 356/28 |
| 4,872,687 A | * | 10/1989 | Dooley | 473/152 |
| 4,891,748 A | * | 1/1990 | Mann | 463/1 |
| 4,915,384 A | * | 4/1990 | Bear | 473/451 |
| 4,949,972 A | * | 8/1990 | Goodwin et al. | 273/371 |
| 5,064,194 A | * | 11/1991 | Bixler et al. | 473/436 |
| 5,230,505 A | * | 7/1993 | Paquet et al. | 473/455 |
| 5,333,855 A | * | 8/1994 | Silin et al. | 473/455 |
| 5,433,434 A | * | 7/1995 | Helmetsie | 473/446 |
| 5,478,239 A | * | 12/1995 | Fuerst et al. | 473/438 |
| 5,479,008 A | * | 12/1995 | Nishiyama et al. | 250/222.1 |
| 5,481,355 A | * | 1/1996 | Iijima et al. | 356/28 |
| 5,509,649 A | * | 4/1996 | Buhrkuhl | 473/455 |
| 5,553,846 A | * | 9/1996 | Frye et al. | 473/455 |
| 5,602,638 A | * | 2/1997 | Boulware | 356/28 |
| 5,605,336 A | * | 2/1997 | Gaoiran et al. | 273/445 |
| 5,682,230 A | * | 10/1997 | Anfinsen et al. | 356/28 |
| 5,704,855 A | * | 1/1998 | Kellogg, Jr. | 473/422 |
| 5,779,241 A | * | 7/1998 | D'Costa et al. | 273/371 |
| 6,881,161 B2 | * | 4/2005 | Heflin, Sr. | 473/448 |
| 7,399,241 B1 | * | 7/2008 | Thomas, Sr. | 473/455 |
| 2003/0073518 A1 | * | 4/2003 | Marty et al. | 473/416 |

* cited by examiner

*Primary Examiner* — Gene Kim
*Assistant Examiner* — M Chambers
(74) *Attorney, Agent, or Firm* — Inventa Capital PLC; Michael G. Shariff

(57) ABSTRACT

A muscular memory training apparatus and method of the present invention is used for training basketball players to shoot a ball to a ring from fixed distances. The apparatus provides numerous advantages including improved training aid and method that teaches the players in a correct manner of making a shot with a basketball, develops muscular memory of the body joints and muscles for proper execution of a basketball shot and makes higher percentage of hitting the goal.

20 Claims, 5 Drawing Sheets

MUSCULAR MEMORY TRAINING APPARATUS AND METHOD

FIELD OF INVENTION

The invention relates to apparatus and methods for sports training, and more particularly to apparatus and method for analyzing a trajectory of an object launched by a human to target and providing feedback information regarding the trajectory of its flight to the human.

BACKGROUND OF THE INVENTION

Sports play important part in our life. Sports are played professionally and recreationally. It is very important to develop skills in playing these sports not only to provide winning results for teams that people play for but also for personal satisfaction. In the game of basketball, for example, the primary skill that determines the success of the team or the individual is the art of proper shooting of the ball. By the way of background, numerous coaches worldwide have researched their teaching methods extensively in order to find the correct way to properly shoot a basketball. From amateurs to professionals, using a device that teaches proper biomechanical release of a basketball will result in higher success and excitement for the game of basketball. Biomechanical movement is directly related to the success of the basketball shot. In order to shoot a basketball for a high percentage, a player needs to use the correct body joints, and muscles attached, together as one unit. Incorporating the least amount of body joints (and muscles) will result in increased muscle memory retention and less chance for biomechanical errors.

According to numerous researches done, the most important biomechanical aspect for proper shooting is a proper release at the wrist joint, and the elimination of finger flexion at finger joints. There are many different games of skill played by human for recreational and competitive purposes. Whether the game is played recreationally or professionally, players generally desire to improve their skills to increase their success at the game. There are many approaches that the player may take to improve their performance. These approaches include reading books, watching videotapes, receiving lessons/coaching, practicing and utilizing training devices.

Past prior art devices unfortunately disregard this important concept, resulting in performance issues regarding the kinetic chain principle of shooting movements. Numerous prior art training devices were taught by U.S. Pat. Nos. 7,854,669 to Marty et al, 5,599,016 to Larkin, 5,813,926 to Vance, and 6,712,722 to Mosley. The U.S. Pat. No. 5,599,016 to Larkin, for example, teaches a muscle memory basketball training aid and method is provided. The training aid includes a pair of base assemblies and a rectangular frame detachably coupled to the base assemblies. The frame includes a pair of shooting bars and a pair of end bars detachably coupled to the shoot bars. A pair of extension members are detachably coupled to the base assemblies and to the frame. A locking device is provided that enables longitudinal adjustment of the extension members relative to the base assemblies, for adjusting the height of the frame assembly relative to the base assemblies. The locking device enables each extension member to be adjusted independently of the other, so that the frame assembly may extend obtusely above the base assemblies, to accommodate plural users of different heights. The training aid is implemented by adjusting the frame assembly to a predetermined height, determined by adjusting the extension members, until the shooting bar extends parallel to a user's wrist, when the user's shooting arm is extended into a finished shooting position. The user is positioned under the opening in the frame and provided with a basketball. The user projects the basketball through the opening in the frame, such that the arm changes from an initial position to the finished shooting position, projecting the basketball towards a target. The motion is repeated to establish muscle-memory of the muscles in the user's shooting arm and the associated muscles, to train the muscles associated with shooting the basketball.

The U.S. Pat. No. 5,813,926 to Vance teaches a basketball free throw training apparatus has a frame having a top horizontal bar. The horizontal bar is adjustably mounted for vertical positioning on the frame, so that the bar can be raised in a horizontal position with respect to the frame and with respect to the floor upon which the frame is mounted. A pair of upstanding closely spaced guide bars extends upwardly from the bar and have a horizontal space therebetween sufficiently wide to permit a basketball to freely pass therebetween. The frame has an extended arm thereon which can be pivoted to a horizontal position and which can extend between the frame and the backboard of a basket so that the frame is accurately positioned from the basket based upon the stature and shooting technique of the user of the equipment. This arm is length adjustable so as to accommodate the spacing requirements of persons of different stature and skill. The method of using the foregoing equipment comprises positioning the frame in front of a basketball basket in spaced relation thereto; raising the bar to a height commensurate with the high point of the shooting trajectory of the person using the equipment, and spacing the bar horizontally from a basket a distance equal to the distance required for a basketball shot by a person to fall from the high point of the trajectory through the basket.

The U.S. Pat. No. 6,712,722 to Mosley teaches a basketball shot training device including a platform having a lower surface and an upper surface. The lower surface is positionable on a flat recipient surface. The upper surface receives a practicing player's feet thereon in a standing orientation. A tether is provided having a first end and a second end. The first end is adjustably secured to the platform. A glove is coupled with the second end of the tether. The glove has an opening therein for receiving a hand of the practicing player therein. The device is capable of detecting the angle and position of the glove following a shot to ascertain whether a shot was properly executed with the requisite "follow-through".

The U.S. Pat. No. 7,854,669 to Marty teaches a basketball free throw training apparatus has a non-intrusive machine vision system that remotely detects trajectories of moving objects may be used to evaluate trajectory parameters for a basketball shot at a basketball hoop by a player. The feedback information, such as a trajectory entry angle into the basketball hoop and/or an entry velocity into the hoop for the shot, may be output to the player in an auditory format using a sound projection device. The information provided by the apparatus to the player is not connected with the movements of the player throwing the ball at the moment, which determine the trajectory of the ball and its elements, which are controlled by the player. These elements are the place of release the ball from the hands of the player throwing the angle and speed of the ball. One of the main reasons why the ball misses the ring are throwing errors, and non repeatable movement. A muscle memory can not be created in this case because the large spread of uncontrolled movements. A muscle memory can be created under the control of movements in the time of the throw, and repeated shot along one trajectory and one set of movements.

One drawback of these devices is that typically they are applied in a manner that departs from the actual play of the sport. The departure from normal playing conditions can limit the effectiveness of the device. For instance, training devices can be used that are attached to a player to help them develop a prescribed trajectory control skill. However, these training devices are not used in the actual play of the game and can be a distraction to the player employing the device.

Another drawback of current training devices is that the player is not provided any feedback that they can use to evaluate their performance or the feedback can be quite detached from the training experience. When a player receives a lesson or coaching, another person watches their performance and can provide immediate feedback that is valuable to the player. With current training devices, the player uses the device and then later can attempt to judge their performance based upon whether they perceive an improvement in their actual play of the game. However, when the player is using the device improperly or training in a less than optimal manner, the devices do not provide any objective feedback that the player can use to evaluate their performance.

Therefore, there is an opportunity and a constant need for improved training devices and methods that allow the player to improve their trajectory skills for games requiring such skills where the training devices are operable in an environment that approximates actual playing conditions, simple to set-up and to operate, develop good muscle memory, and provide immediate and objective feedback to the user of the device.

SUMMARY OF THE INVENTION

In general, an inventive system of the present invention presents a muscular memory training apparatus and method of the present invention is used in basketball. The apparatus adaptable for detecting moving object, such as a ball, moving through a sensor system, analyzing a trajectory of object and providing immediate feedback information to a human that has launched the object into flight. The apparatus and method of the present invention allows the player to improve their trajectory skills for games requiring such skills where the apparatus is operable in an environment that approximates actual playing conditions, simple to set-up and to operate, develop good muscular memory, and provide immediate and objective feedback to the user of the apparatus.

The scientists have noted, that a man makes two types of motions:—controlled by brain,—not controlled by brain. Not controlled motions are repeating motions, controlled by muscular memory. These motions exclude choice, doubt and therefore are exact. Good examples of these motions are walking, using pedals for driving car, and another. This method is specifically designed for training a basketball player to practice and perfect the correct shooting technique. Apparatus counts average trajectory and its elements from 10 the best shots and it will be base for following training. Repetition of the correct shooting form will force the human muscles to memorize the correct motions and automatic skill in the proper form through feedback enhanced learning. The player's brain puts together the correct motion along with the three elements of the ball flight during the shot. These elements are: place of disengaging ball, angle of throwing, and velocity. This combination of elements and motions must be fine tuned by the player and memorized by the human brain and muscles. Transfer memory of motions from brain to muscular memory is possible by multiple repetitions one only set of motions. The feedback the brain to result of shot is necessary. The better work is light-sound system that makes different react on result of shot and makes active reaction of player. It is irritating of player when shot is bad and sedative when shot is good. It also friendly prompts to player what and how he does not to do in next shot. Player must respond to this advice and change his motions as require. Maximum concentration to shots is necessary. Nothing should disturb player in this procedure.

Multiple repetitions of the best shots create muscular memory that is the memory that works without using the conscious centers of the brain. This moment will be noted that shots will make confidently, without thinking about action, aiming preparation, with high percentage of goal. This is the main purpose of method. Conversely, in the absence of muscle memory player, a strong desire to make effective throw, nervous excitement, doubt and uncertainty in the time of the throw makes the brain active and destroy the coordination of movements that lead to failure. For example, NBA players are doing 30-40% hit shots from beyond the arc (3P) during the game. That is, they can not repeat the movement of successful shots. The worlds greatest free throw shooter Fred Newman setting a World Record by making 209 three pointers in a row. This is a work of muscular memory. Multiple repetitions of these shots consolidate muscular memory of these motions. The physiology of the brain suggests that after several hundred repetitions (300-600) of the complicated motions during the training period, the motion begins to become automatic or controlled by muscular memory. A player can turn 500 shots within 40-50 minutes. Periodic training is necessary to keep active muscular memory. Frequency and duration of training depends on personal capability of player. The best result of the use of muscle memory will be created if it is to throw on a trajectory that has the high efficiency of getting into the ring, the trajectory with a maximum hit probability. With the help of computer graphics and engineering of AutoCAD, the trajectory of the ball entering in the ring for free throws and shots from beyond the arc-3P shots for players of different heights and different angles of quitting can be constructed and presented to be analized.

By analyzing the various elements of the trajectories, possible and inevitable deviations in throwing their influence, were found trajectory with the maximum probability of hitting and be recommended for use by players. The entire trajectory of the ball in the ring can be characterized by the following elements at the time of throwing: the position of the place the ball release from the hands of the player's as such distance to the ring and height (H), the angle of the ball in the initial section, or throwing angle (A), the speed of the ball in the initial section (T). The player can easy control elements of the trajectory at the time of the throw. This becomes more accessible, if the player knows the magnitude and direction of the trajectory deviations of elements previous shot from the baseline values of elements of the average trajectory. Player needs to know what and how he should fix in the next shot, if he needs it. The player does not need to know the absolute values of elements of the path and make the necessary calculations for the next shot. The player must know that in the previous shot was done right or wrong, and how and what to change.

It is enough to know the magnitude and direction of deviation. Information about the quality of shot will be executed as a clear and understandable if it would look as a mnemonic of color, light character of the deviations of the elements performed by the throw. This is a schematic trajectory of the ball in the ring with green characters on the basic elements of this curve and the yellow and red symbols abnormalities. Information on each shot of the melody is accompanied by a different duration for the green and yellow symbols and cacophony—for red characters. For those who prefer numbers, the system can present numerical values of the deviations of height and angle of release of the ball drop. Suggested theoretical trajectory with a maximum hit probability, the effectiveness of which will be confirmed a few throws, will be improved if we make the average trajectory and its elements, such as arithmetical mean values of the trajectories of the top 10 throws made for a suggested path or with minor deviations from its height and angle of release of the ball drop.

The average trajectory and its elements will be the basis for subsequent training, implementation of which will be mandatory for the strides of the player. The apparatus fully supports this method. The apparatus is installed between the player and the ring, at the place of release of the ball from the hands of the player throwing the ball in the ring and on the angle of flying the ball. After the guaranteed release the ball from the hands of the player front surface of the ball should enter the sensitive plane of the apparatus at the inlet of the apparatus, and then, after some time, enter in the sensitive plane at the exit from the apparatus. In this case, the center of the ball should fly through the line of the axis of rotation of the sensitive frame and a single ray detectors at the entrance and exit from the apparatus. Apparatus and sensitive frame installed and secured on-site for training in place appropriate physical data of player, and this installation of apparatus fix and memorize by two linear scales, and one angular scale of apparatus. This is the distance from the line on the floor throwing up on the floor of the projection line of the axis of rotation of the sensitive frame (12"-36"), the height of the axis of rotation of the sensitive frame from flow (90"-125"); angle of sensitive frame to the horizon (35 deg.-55 deg.)

After installation of the apparatus, its sensitive system determines the following parameters such as the height of entry the ball in the apparatus from bottom blocked beam of sensitive array; angle of ball flight as the difference between the numbers of the first from bottom blocked beams of sensitive array at the entrance to the ball in the apparatus and the exit of the ball from it. The system further determines speed of flight of the ball is an actual time of the flight of the ball between the moment when the ball enters the beams of the single sensors as the ball enters the apparatus and exits the apparatus.

Alluding to the above and as described in details, the apparatus for training skills and developing the muscular memory of a person shooter engaged in an activity wherein the person shooter is trying to develop the muscular memory in order to improve the skills at aiming hitting an object at a target and by sending an object from an isolated point settled distances to the target includes a holding frame moveable platform presenting a base movable to and from the isolated point settled distances relative the target. A sensing frame device is connected to and extends from the holding frame moveable platform and is movable relative the holding frame moveable platform at least two directions. The sensing frame presents a first set of an emitter and a receiver for emitting and receiving array of light invisible photoelectric beams and a second set of an emitter and a receiver for emitting and receiving array of invisible photoelectric beams with the first set and the second set being spaced from one another along and positioned on a rigid sensing frame being movable to up and down and from the base at various angles defined between the base and the rigid sensing frame.

An indicator device is connected to the holding frame moveable platform is adaptable to inform the person shooter about location of the object thrown by the person shooter in relationship to the target trajectory of flight object and the first and second sets wherein the person shooter is informed in at least one of numerical indication, voice indication, and color indication. A controller is operably communicated with the first and second sets to receive information therefrom about trajectory of the object as the object is disengaged from the person shooter and enters the target apparatus whereby the controller receives a first data related to orientation of the object relative to the array of the first set as the object enters the array of the first set and the single sensing device adjacent the first set and a second data related to an angle of travel path of the object defined between a point when the object enters the first set and leave the second set and a third data related to time of travel of the object as the object enters the first set and leaves the second set to calculate data of the average trajectory from 10 best shots and determine deviation of data of current shot from an average data and informing the person shooter through the indicator device about deviation of data of current shot in at least one of numerical indication, voice indication, and color indication. The apparatus improves skills of sending the object directly to the target and developing muscular memory of the person shooter.

The apparatus includes a pair of singular sensor devices for emitting and receiving a single invisible photoelectric beam adjacent each of the first and second sets with the single invisible photoelectric beam extending in parallel with the arrays of invisible photoelectric beams emitted and received by each of the first and second sets. The apparatus includes a timer device communicated with the controller and the pair of single sensor devices for measuring time defined between a first point as the object enters the first set and passes adjacent and through the single invisible photoelectric beam at the first set and a second point as the object enters the second set and passes adjacent and through the single invisible photoelectric beam at the second set. The first set array is electronically connected to a first MAC controller for scanning the beams of the first set array and the second set array is electronically connected to a second MAC controller for scanning the beams of the second set array to determine number of the beams blocked by the object and with the first MAC controller and the second MAC controller being cooperable with the controller.

The apparatus includes a programmable logistic controller device (PLC) of the controller cooperable with the first and second sets MACs and the single sensor devices to receive information about blocked beams of the first and second sets as the object enters the first and second sets and output the data in the form of two digits thereby comparing the time and the two digits to determine the trajectory. The PLC compares the average data with data of each shot other than the average data thereby determining deviations and outputting the deviations to an information panel of said indicator device and then selectively presenting the data to the person shooter via colored light-emitting diodes (LED) and sounds thereby helping the person to properly react on next shot. The apparatus includes an operator panel allowing the person to input personal information.

An advantage of the present invention is to provide an improved training aid and method that teaches the body joints and muscles in a correct manner of making a shot with a basketball without restrictive devices.

Another advantage of the present invention is to provide an improved training aid and method that develops muscular memory of the body joints and muscles for proper execution of a basketball shot.

Still another advantage of the present invention is to provide an improved training aid and method that is adaptable for different size users.

Still another advantage of the present invention is to provide an improved training aid that is movable.

Still another advantage of the present invention is to provide an improved training aid that comprises component parts that are detachable for facile storage and transportation of the aid.

Other advantages and meritorious features of this invention will be more fully understood from the following description of the preferred embodiment, the appended claims, and the drawings a brief description of which follows.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE INVENTION

Figure 1:
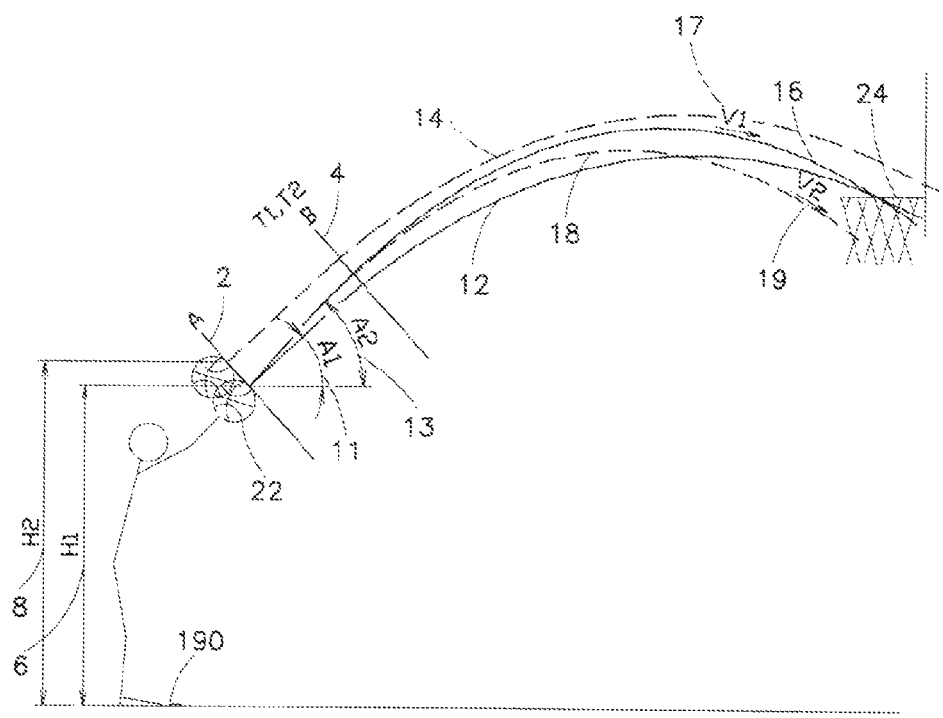
FIG. 1 shows a schematic view of a person throwing a basketball from an isolated point to a basket wherein the ball enters a crossing surface A and passing through a crossing surface B.
Figure 2:
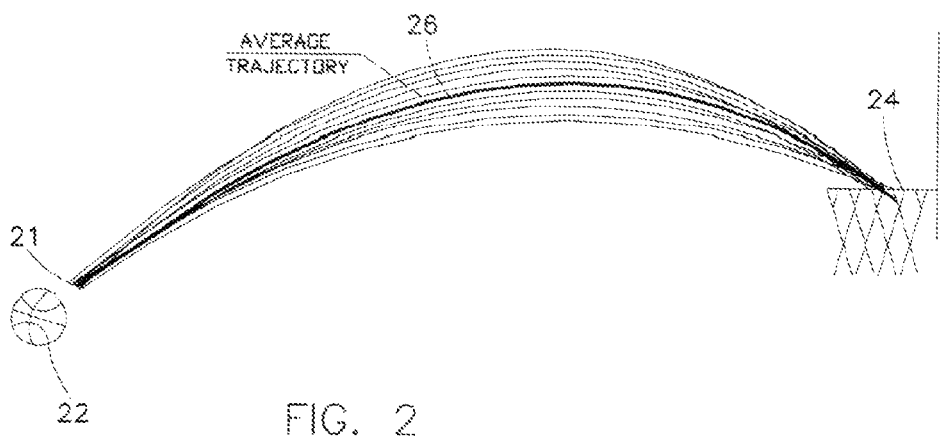
FIG. 2 shows a schematic view of a plurality of trajectory lines between place of disengaging of the ball and the basket further illustrating an average trajectory line defined between place of disengaging of the ball and the basket.
Figure 3:
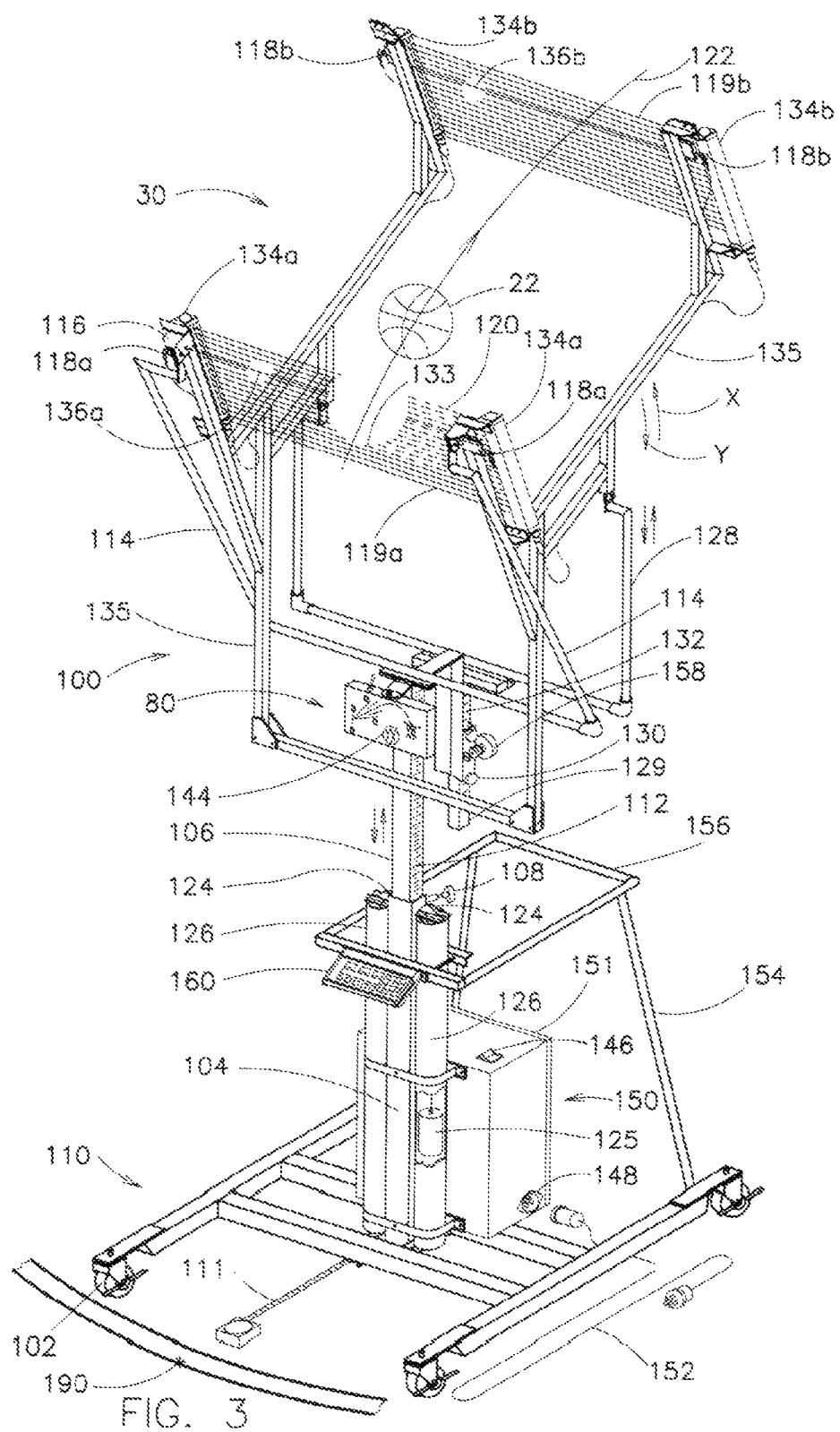
FIG. 3 shows a perspective view of a training apparatus of the present invention.
Figure 4:
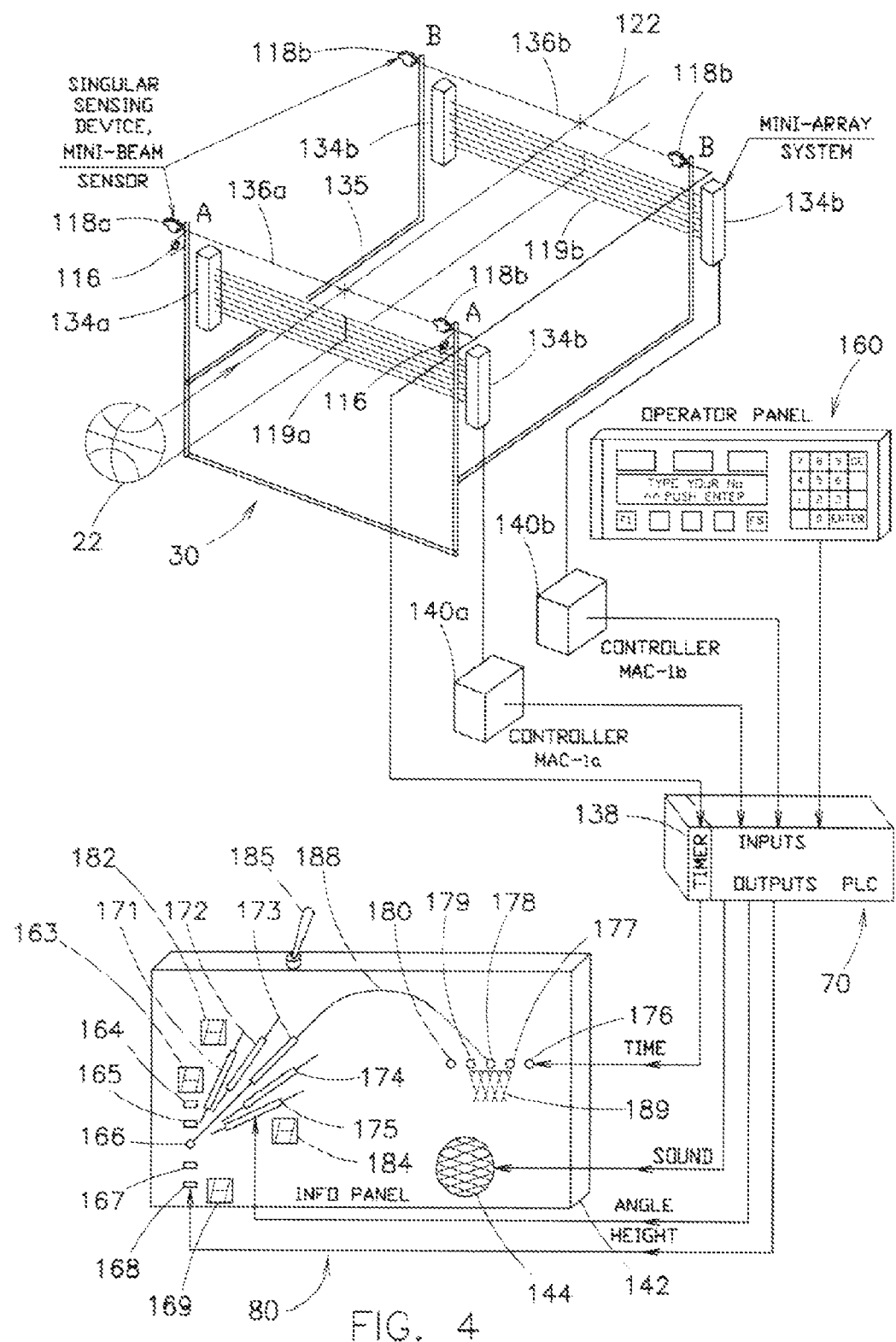
FIG. 4 shows a perspective and schematic view of the sensing device of the apparatus of the present invention as shown in FIG. 3 with a schematics of all operative components associated with the sensing device.
Figure 5:
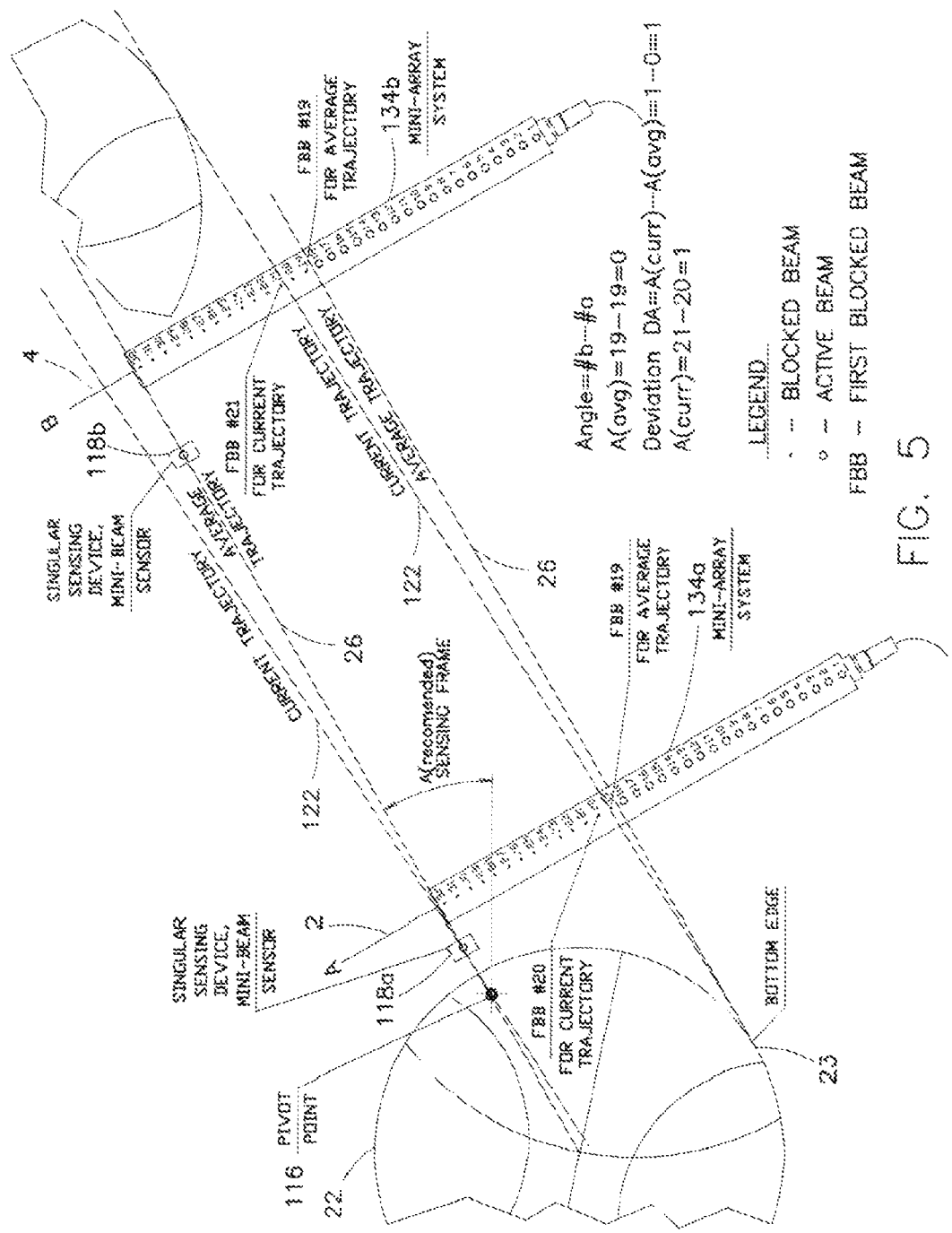
FIG. 5 shows another schematic view basketball entering the crossing surface A and passing through the crossing surface B.

Referring to FIGS. 1 through 7, wherein like numerals indicate like or corresponding parts, an apparatus of the present invention is generally shown at 100 in FIG. 3 and partially in FIG. 4. Based on various designs and intended industrial applications, the apparatus 100 of the present invention can perform various functions and can be used as a training tool for developing a muscular memory in various sport activities that require sending a object, such as a basketball 22 to a target location, such as a ring 24 as shown in FIGS. 1 and 2.

FIG. 1 illustrates a crossing surface A and a crossing surface B, shown at 2 and 4, respectively, and a player holding the ball 22. The player may extend between two different initial height 6 and 8, when the player throws the ball 22. FIG. 1 further defines an angle of throwing A1 shown at 11, a trajectory 12, another angle of throwing A2, shown at 13, and trajectorie 16, a velocity of flying V1, a trajectory 18, and another velocity of flying V2. FIG. 2 shows an average trajectory 26 as it extends from place of disengaging 21 of the ball 22 to the ring 24.

Figure 6:
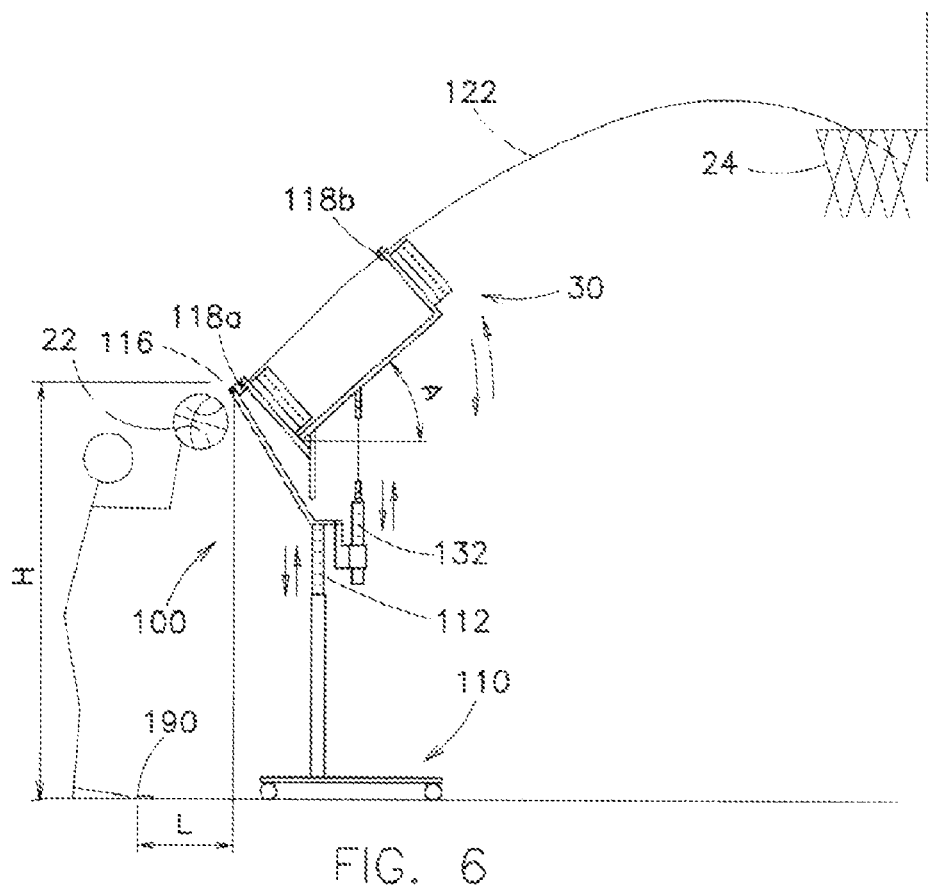
FIG. 6 shows a schematic view of the person located next to the apparatus of the present invention wherein the person is in the process of throwing the basketball from the isolated point to the basket wherein the basketball enters the crossing surface A and passing through the crossing surface B.
Figure 7:
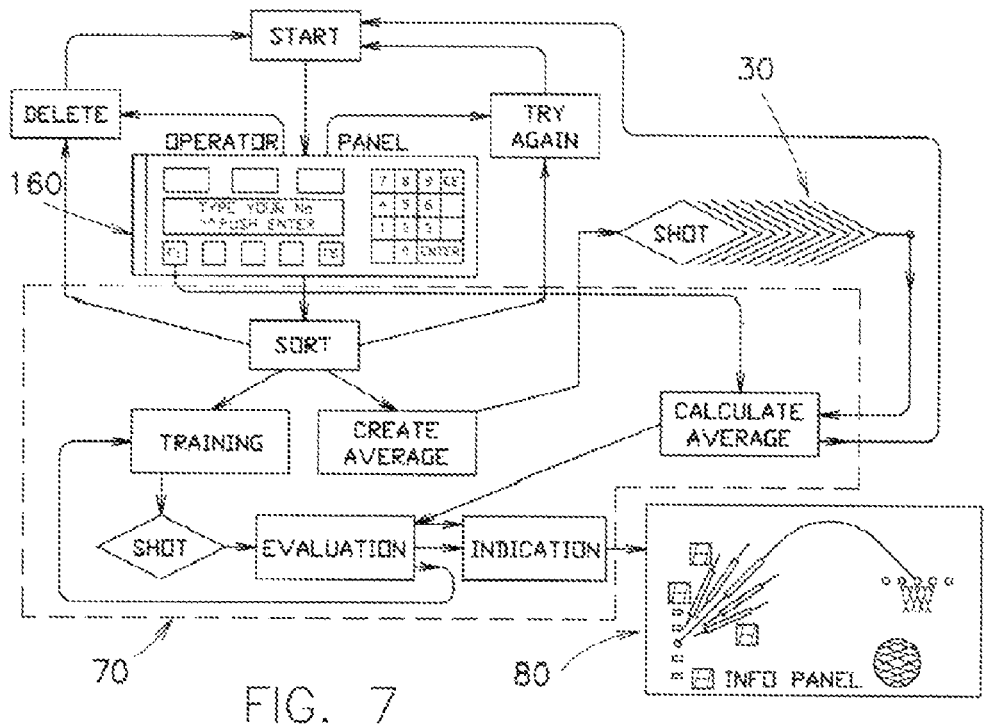
FIG. 7 shows a schematic view of the operational components of the present invention.

Referring now to FIGS. 3, 4 and 6, the apparatus 100 is used for training skills and developing the muscular memory of the person shooter engaged in an activity wherein the person shooter is trying to develop the muscular memory in order to improve the skills at aiming and hitting the object 22 at the target 24 and by sending the object 22 from an isolated point 190 settled distances to the target 24. The apparatus 100 includes caster wheels 102, a vertical rectangular form pole 104, a second telescoping rectangular tube 106, and a clamp 108 to allow the tube 106 to telescopic move relative the pole 104 at various heights. The caster wheels 102 are connected to a platform 110 that also holds the pole 104 extending outwardly therefrom.

A tape measure 111 extends from the platform 110 to fix a position of the player relative the frame 110. The tube 106 also includes a linear scale 112 to determine the heights a pivot point 116 in inches as the tube 106 is moved away from the tube 104. The apparatus 100 includes a U-form bracket 114, a sensing frame 135 with a mini-array measuring light screen systems 134a and 134b having emitter and receiver for emitting photoelectric set of beams 119a and 119b and a singular sensors, mini beam photoelectric set of sensors (emitters and receivers) 118a and 118b for emitting photoelectric a single beams 136a and 136b, wherein the beam 136a and beams 119a are blocked by the ball 22 thereby defining first blocked beam 133 as the ball 22 form a trajectory 122. A pair of pulleys 124 and counterbalances 125 extending through a plastic housing or cover 126. The apparatus 100 also includes a support frame 128, a clamp 130 for securing degree of angle A. A linear scale 132 controls degree of angle A.

A controllers such as for example, MAC-1, are shown at 140 and are used for scanning the beams of arrays. A timer 138 is also included in the apparatus 100. A box of info panel is shown at 142, a sound generating device is shown at 144. An enclosure 150 covers the box 151. The box 151 includes a switch 146 and a receptacle 148 and power supply, controllers MACs 140 and programmable logistic controller (PLC) 70 are inside. A power cable 152 extends from the electrical enclosure 150. A post 154 is connected to the movable platform 110 and interconnects the platform 110 with a handrail 156. The apparatus also includes a gear and rack mechanism 158 for changing angle of sensing frame 135 and an operator panel 160.

Referring now to FIG. 4, a perspective and schematic view of the sensing device of the apparatus 100 of the present invention as shown in FIG. 3 are illustrated. FIG. 4 also illustrates a schematic view of all operative components associated with the sensing device of the apparatus 100.

An indicator device having the info panel 80 to inform the person shooter about location of the object 22 thrown by the person shooter in relationship to the target trajectory of flight of the object 22. The person shooter is informed in at least one of numerical indication. A digital displays of deviation are shown at 163, 169, 182 and 184. Red LED deviation of height are shown at 164 and 168. A yellow LED deviation of height are shown at 165 and 167. A green LED height is base and shown at 166. A digital displays of height deviation are shown at 163 and 169. Red LED deviation of angle are shown at 171 and 175. Yellow LED deviation of angle are shown at 172 and 174. A green LED angle is base and shown at 173. Digital displays of angle deviation are shown at 182 and 184.

Red LED deviation of time are shown at 176 and 180. Yellow LED deviation of time are shown at 177 and 179. A green LED time is base and shown at 178. Those skilled in art will appreciate that colors such as "Red", "Yellow", and "Green" are shown for illustrative purposes and are not intended to limit the scope of the present invention. Multiple other colors may be used in order to show the person different degrees of deviations of time, height, and angle.

Referring back to FIGS. 3, 4 and 6, the apparatus 100 that includes a holding frame 104, 106 with moveable platform 110 presenting the base movable to and from the isolated point 190 settled distances relative the target 24. The sensing frame device 30 connected to and extending from the holding frame 104 and 106 extending from the moveable platform 110 and movable relative the holding frame moveable platform at least two directions.

The sensing frame 30 presenting a first set of an emitter and a receiver 134a for emitting and receiving array of light invisible photoelectric beams 119a and a second set of an emitter and a receiver 134b for emitting and receiving array of invisible photoelectric beams 119b. Each first set and second set 134a and 134b are spaced from one another along and positioned on a rigid sensing frame 135 being movable to up and down, and from the base at various angles defined between the base and the rigid sensing frame 30 as shown by arrows X and Y. The U-form bracket 114 and the support frame 128 are also connected to the rigid sensing frame 135.

The controllers defined by the aforementioned programmable logistic controller (PLC) 70 and the controllers MAC 1a and 1b as shown at 140a and 140b operably communicated with the first and second sets 134a and 134b and the singular sensors 118a and 118b to receive information therefrom about trajectory of the object 22 as the object is disengaged from the person shooter and flying to the target 24.

The controller receives a first data related to the height as orientation of the object 22 relative to the array of the first set as the object 22 enters the array 119a of the first set 134a and a second data related to an angle of travel path of the object 22 defined between a point when the object 22 enters into the array of the first set 134a and enters into the array of the second set 134b and a third data related to time of travel of the object 22 as the object 22 enters the beam 136a of the first the single sensing device 118a and enters the beam 136b of the second the single sensing device 118b.

The controller calculates data of the average trajectory from multiple best shots and determine deviation of data of current shot from an average data and informing the person shooter through the indicator device 80 about deviation of data of a current shot in at least one of numerical indication, voice indication, and color indication thereby improving skills of sending the object directly to the target and developing muscular memory of the person shooter.

The pair of singular sensor devices 118a and 118b for emitting and receiving the single invisible photoelectric beams 136a and 136b adjacent each of the first and second sets 134a and 134b with the single invisible photoelectric beams 136a and 136b extending in parallel with the arrays of invisible photoelectric beams 119a and 119b emitted and received by each of the first and second sets 134a and 134b. The apparatus 100 further includes a timer device 138 communicated with said controller 70 and the pair of single sensor devices 118a and 118b for measuring time defined between a first point as the object 22 enters the first set 134a and passes adjacent and through the single invisible photoelectric beam 136a at the first set and a second point as the object 22 enters the second set and passes adjacent and through the single invisible photoelectric beam 136b at the second set 134b.

Alluding to the above, the first set of array 134a is electronically connected to the first MAC controller 140a for scanning the beams of the first set array 134a and the second set of array 134b is electronically connected to the second MAC controller 140b for scanning the beams of the second set array to determine numbers of the first blocked beams 133 by the object 22. The first MAC controller 140a and the second MAC controller 140b are cooperable with the controller having the programmable logistic controller device (PLC) 70 also cooperable with the first and second sets of MAC controllers 140a and 140b and the single sensor devices 118a and 118b to receive information about blocked beams of the first and second sets 134a and 134b, 118a and 118b as the object 22 enters the first and second sets 134a and 134b, 118a and 118b and output the data in the form of two digits thereby comparing the time and the two digits to determine the trajectory.

The PLC 70 to compares the average data with data of each shot thereby determining deviations and outputting the deviations to the information panel 80 of the indicator device and then selectively presenting the data to the person shooter via colored light-emitting diodes (LED) or sounds, or combination thereof thereby helping the person to properly react on next shot. An operator panel 160 allows the person to input personal information.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An apparatus for training skills and developing a muscle memory of a person shooter engaged in an activity wherein the person shooter is trying to develop the muscle memory in order to improve the skills at aiming and hitting an object at a target and by sending the object from an isolated point settled distances to the target, said apparatus comprising in combination with a basketball or a basketball goal a holding frame moveable platform presenting a base movable to and from the isolated point settled distances relative the target;

a sensing frame device connected to and extending from said holding frame moveable platform and movable relative said holding frame moveable platform at least two directions, said sensing frame presenting a first and second set of emitter and receiver of mini-array and a pair of singular sensor devices for emitting and receiving light invisible photoelectric beams with said first set and said second set being spaced from one another along and positioned on a rigid sensing frame being movable to up and down and from said base at various angles defined between said base and said rigid sensing frame;

a programmable logistic controller device (PLC) connected via controllers MACs and timer with said first and said second set of mini-array and said pair of singular sensor devices while flying object enters into said first and second set and defined using of blocked beams the elements of trajectory, such as height of enter object into said apparatus, angle of flying object through said apparatus and time such as real time of the object flight between the blocked beams of said pair of singular sensor devices, calculates data of the average trajectory from multiple best shots and determines deviation of data of current shot from an average data and informing the person shooter through said indicator device about deviation of data of a current shot;

an indicator device adaptable connected to said holding frame moveable platform and electronicaly connected to said PLC is informed the person shooter by at least one of numerical indication, voice indication, and color indication about deviation of elements of trajectory of a current shot.

2. An apparatus as set forth in claim 1 including a pair of singular sensor devices for emitting and receiving a single invisible photoelectric beam adjacent each of said first and second sets with the single invisible photoelectric beam extending in parallel with the arrays of invisible photoelectric beams emitted and received by each of said first and second sets.

3. An apparatus as set forth in claim 2 including a timer device communicated with said controller PLC and said pair of single sensor devices for measuring time defined between a first point as the object enters said first set and passes adjacent and through the single invisible photoelectric beam at said first set and a second point as the object enters said second set and passes adjacent and through the single invisible photoelectric beam at said second set.

4. An apparatus as set forth in claim 2 wherein said first set array is electronically connected to a first MAC controller for scanning the beams of said first set array and said second set array is electronically connected to a second MAC controller for scanning the beams of said second set array to determine numbers of the first blocked beams by the object and with said first MAC controller and said second MAC controller being cooperable with said controller PLC.

5. An apparatus as set forth in claim 4 including a programmable logistic controller device (PLC) of said controller cooperable with said first and second sets MACs and said single sensor devices to receive information about blocked beams of said first and second sets as the object enters the first and second sets and output the data in the form of two digits thereby comparing the time and the two digits to determine the trajectory.

6. An apparatus as set forth in claim 5 wherein said PLC compares said average data with data of each shot thereby determining deviations and outputting the deviations to an information panel of said indicator device and then selectively presenting the data to the person shooter via colored light-emitting diodes (LED) and sounds thereby helping the person to properly react on next shot.

7. An apparatus as set forth in claim 2 further including an operator panel allowing the person to input personal information.

8. An apparatus as set forth in claim 2 wherein the object is a basketball and the target is a basket.

9. An apparatus set forth in claim 2 wherein said holding frame moveable platform is further defined by a base frame with the caster wheels to move said apparatus between various locations.

10. An apparatus set forth in claim 2 wherein said holding frame moveable platform is further defined by a pair or telescoping tubes movable in a telescoping fashion to move said sensing frame at various heights.

11. An apparatus for training skills and developing a muscle memory of a person shooter engaged in an activity wherein the person shooter is trying to develop the muscle memory in order to improve the skills at aiming and hitting an object at a target and by sending the object from an isolated point settled distances to the target, apparatus comprising in combination with a basketball or a basketball goal a holding frame moveable platform presenting a base movable to and from the isolated point settled distances relative the target;

a sensing frame device connected to and extending from said holding frame moveable platform and movable relative said holding frame moveable platform at least two directions, said sensing frame presenting a first set of an emitter and a receiver for emitting and receiving arrays of light invisible photoelectric beams and a second set of an emitter and a receiver for emitting and receiving arrays of invisible photoelectric beams with said first set and said second set being spaced from one another along and positioned on a rigid sensing frame being movable to up and down and from said base at various angles defined between said base and said rigid sensing frame;

an indicator device connected to said holding frame moveable platform adaptable to inform the person shooter about location of the object thrown by the person shooter in relationship to the target trajectory of flight object and said first and second sets wherein the person shooter is informed in at least one of numerical indication, voice indication, and color indication; and a controller operably communicated with said first and second sets to receive information therefrom about trajectory of the object as the object is disengaged from the person shooter and enters the target whereby said controller receives a first data related to orientation of the target object relative to the arrays of said first set as the object enters the arrays of said first set and said single sensing device adjacent said first set and a second data related to an angle of travel path of the object defined between a point when the object enters said first set and leave said second set and a third data related to time of travel of the object as the object enters said first set and leaves said second set to calculate data of the average trajectory from multiple best shots and determine deviation of data of current shot from an average data and informing the person shooter through said indicator device about deviation of data of a current shot in at least one of numerical indication, voice indication, and color indication thereby improving skills of sending the object directly to the target and developing muscle memory of the person shooter.

12. An apparatus as set forth in claim 11 including a pair of singular sensor devices for emitting and receiving a single invisible photoelectric beam adjacent each of said first and second sets with the single invisible photoelectric beam extending in parallel with the arrays of invisible photoelectric beams emitted and received by each of said first and second sets.

13. An apparatus as set forth in claim 12 including a timer device communicated with said controller and said pair of single sensor devices for measuring time defined between a first point as the object enters said first set and passes adjacent and through the single invisible photoelectric beam at said first set and a second point as the object enters said second set and passes adjacent and through the single invisible photoelectric beam at said second set.

14. An apparatus as set forth in claim 12 wherein said first set arrays is electronically connected to a first MAC controller for scanning the beams of said first set arrays and said second set arrays is electronically connected to a second MAC controller for scanning the beams of said second set arrays to determine number of the beams blocked by the object and with said first MAC controller and said second MAC controller being cooperable with said controller.

15. An apparatus as set forth in claim 14 including a programmable logistic controller device (PLC) of said controller cooperable with said first and second sets MAC and said single sensor devices to receive information about blocked beams of said first and second sets as the object enters the first and second sets and output the data in the form of two digits thereby comparing the time and the two digits to determine the trajectory.

16. An apparatus as set forth in claim 15 wherein said PLC compares said average data with data of each shot other than said average data thereby determining deviations and outputting the deviations to an information panel of said indicator device and then selectively presenting the data to the person shooter via colored light-emitting diodes (LED) and sounds thereby helping the person to properly react on next shot.

17. An apparatus as set forth in claim 12 further including an operator panel allowing the person to input personal information.

18. An apparatus as set forth in claim 12 wherein the object is a basketball and the target is a basket.

19. An apparatus set forth in claim 12 wherein said holding frame moveable platform is further defined by a base frame with rollers to move said apparatus between various locations.

20. A method of claim 1 wherein said method of training skills and developing a muscle memory of a person engaged in an activity wherein the person is trying to develop the muscular memory in order to improve the skills at aiming at a target and sending an object from an isolated point settled distance to the target, said method comprising the steps of:
- beginning the training by positioning a shooter is in a usual shooting position and using a natural style of the shooter while the shooter is shooting the object through the apparatus;
- measuring the trajectory of the object on the part of the initial section wherein the trajectory is divided onto the elements in its initial part such as height, angle and speed thereby allowing the shooter to understand what means the elements of trajectory and how to change separately any element while throwing;
- changing of the elements of the trajectory flying object in its initial part changes a location of object relatively the target in end of flying object;
- digitally measuring the elements of trajectory;
- using of the player the trajectory of shots with maximum probability of hitting the object to the target;
- calculating an average trajectory and its average elements from several best acceptable by shooter shots, which hit the goal, and which used trajectory close to trajectory of maximum probability of hitting, and that will be base of future calculation;
- calculating the value of deviations of current elements of trajectory of each shot, comparing with average elements;
- using immediately feedback information of shot as notices about deviations of elements of trajectory as mnemonic symbols of value and direction, different colors, and sounds for changing motions for next shot;
- shooting with the deviations on beginning and gradually pass to shooting without the deviations; and
- multiple repetition of the best shot without the deviations and one set of motion only creates muscular memory of the shot.

* * * * *